H. N. EVANS, Sr.
COUPLING VALVE.
APPLICATION FILED JUNE 5, 1917.
1,263,542.
Patented Apr. 23, 1918.
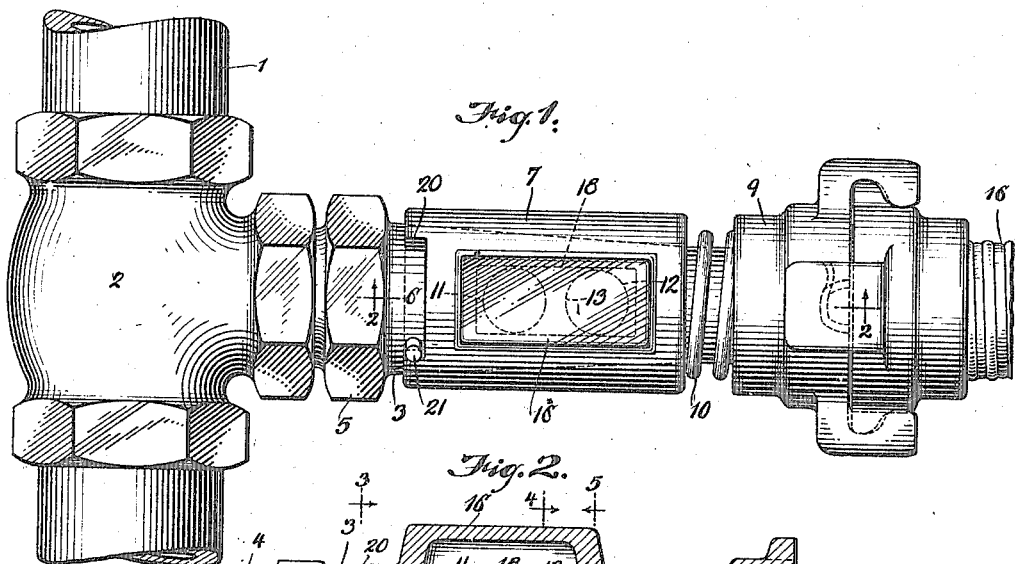
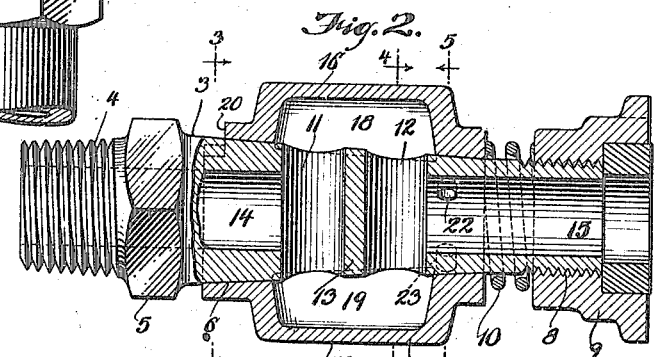
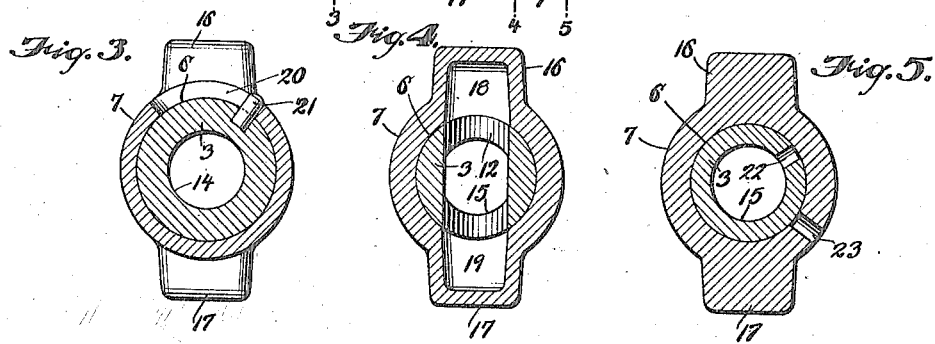
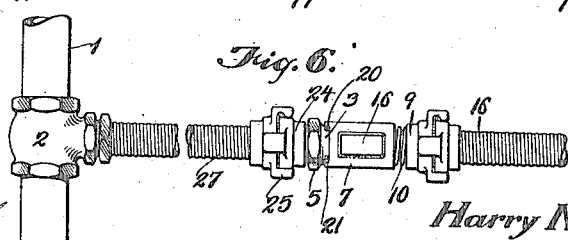
Witnesses
H. Harwood
C. R. Ziegler
Inventor
Harry N. Evans, Sr.
By
Joshua R. H. Potts
his Attorney

UNITED STATES PATENT OFFICE.

HARRY N. EVANS, SR., OF PHILADELPHIA, PENNSYLVANIA.

COUPLING-VALVE.

1,263,542.

Specification of Letters Patent.

Patented Apr. 23, 1918.

Application filed June 5, 1917. Serial No. 172,881.

*To all whom it may concern:*

Be it known that I, HARRY N. EVANS, Sr., a citizen of the United States, residing at Philadelphia, in the county of Philadelphia and State of Pennsylvania, have invented certain new and useful Improvements in Coupling-Valves, of which the following is a specification.

My invention consists of a coupling valve and is particularly adapted for use in connection with pneumatic tools.

It is well known that pneumatic tools, such as riveters and hammers, have often caused injury to persons due to the accidental operation of the tools. These accidents often occur for the reason that there is no valve near the workman which he can turn off when he has temporarily finished with the tool, and the tool containing the air under great pressure is permitted to lie on the floor with the above mentioned injurious result.

One object of my invention is to provide a valve which can be placed in connection with and near the tool, and which can be easily and quickly turned, thus with its use there will be no excuse for the workman to permit the tool to remain under pressure when not in service.

Another object is to so construct my improved valve that when it is turned to cut off the main air pressure, it will permit the pressure in the hose or pipe between the valve and the tool to be reduced.

A further object is to make my improved valve of simple and durable construction.

These objects, and other advantageous ends which will be described hereinafter, I attain in the following manner, reference being had to the accompanying drawings in which—

Figure 1 is a top plan view showing my improved coupling valve connected with a supply pipe and flexible leader hose such as is used to supply air to the pneumatic tools.

Fig. 2 is a longtiudinal section of my improved valve taken on the line 2—2 of Fig. 1, the main supply pipe and the leader hose being omitted.

Fig. 3 is a transverse section on the line 3—3 of Fig. 2.

Fig. 4 is a transverse section on the line 4—4 of Fig. 2.

Fig. 5 is a transverse section on the line 5—5 of Fig. 2.

Fig. 6 is an outside view showing how my improved valve can be inserted within the length of flexible leader hose, so that it can be positioned directly adjacent the pneumatic tool which is usually connected to the free end of the leader hose.

Referring to Figs. 1 to 5 inclusive of the drawings, 1 represents an air supply pipe such as would be mounted on or adjacent the floor level of a building under construction and has a T-fitting 2 as clearly shown in Fig. 1.

My improved valve has a stem 3 provided with a screw-thread 4 at one end adapted to be screwed within the fitting 2, an angular outer surface 5 being provided on said stem to permit the latter to be turned by a wrench. The stem 3 has a tapered or frusto-conical outer surface 6 and upon this frusto-conical surface is rotatable a casing 7, the casing 7 having a frusto-conical bore so as to closely fit upon the surface 6 and to provide a tight joint therewith for a reason which will be hereinafter fully described.

The opposite end of the stem 3 is externally screw-threaded at 8 to receive a screw-threaded coupling member 9, and a coiled spring 10 is interposed between the coupling member 9 and the adjacent end of the casing 7. The stem 3 within the length of the frusto-conical portion has two transversely extending holes 11 and 12. These holes are formed entirely through the stem and form passages which are separated by a solid wall 13 as clearly illustrated in Fig. 2.

A passage 14 leads through the screw-threaded end 4 of the stem 3 and communicates with the transversely extending passage 11, while a passage 15 leads through the opposite end of the sleeve and communicates with the transversely extending passage 12.

The casing 7 has two oppositely disposed bosses 16 and 17. These bosses provide elongated chambers 18 and 19 respectively and intersect the inner wall of the casing so that when the valve casing is turned in the position illustrated in Fig. 2, the chambers 18 and 19 form ports which permit communication between adjacent opposite ends of the passages 11 and 12, thus air passing inwardly through the end 4 of the stem 3 will pass through the transverse passage 11, part of the air going through the port 18, and another part going through the port 19. The air passing through the ports 18 and 19 will then pass into the opposite ends of the passage 12 and eventually out through the passage 15 through the leader hose 16 to the pneumatic tool (not illustrated).

The width of the ports 18 and 19 is such that when the casing 7 is turned substantially a quarter of a turn, a solid portion of the casing will cover the opposite ends of the passages 11 and 12, thus cutting off communication between the passages 14 and 15. To limit the relative movement between the casing 7 and the stem 3, I form a notch 20 in the casing 7 and provide the stem 3 with a pin 21. This pin will limit the movement of the casing a distance equal to the length of the notch 20.

In order to prevent the tool remaining under pressure of the imprisoned air when the valve is shut off by the turning of the casing 7, I provide a vent hole 22 in the stem 3 which leads outwardly from the passage 15 and is designed to register with another hole 23 which extends through the casing 7 (see Figs. 2 and 5).

The holes 22 and 23 are so spaced with relation to each other that when the casing 7 is turned to close the passages 11 and 12, said holes 22 and 23 will be in registry to permit the imprisoned air within the passage 15 and leader hose 16 to bleed to the atmosphere.

The spring 10 being interposed between the coupling member 9 and the end of the casing 7, will always insure a good fitting connection between the outer frusto-conical surface of the stem 3 and the bore of the casing 7. The tension of the spring 10 can be varied by the rotation of the coupling member 9 so as to take up for wear.

As illustrated in Fig. 6, instead of having the screw-threaded end 4 of the stem 3 directly screwed in the T-fitting 2 of the pipe 1, I utilize said end 4 to screw into another coupling member 24 and join this coupling member with another coupling member 25 which is connected to the end of a section of leader hose 27 which in turn connects with the fitting 2. Thus, my improved valve can be located sufficiently near the workman to be within his reach, so that if desired it is not necessary for him to release hold on the tool until after he has turned the valve casing 7 to cut off the pressure from the main supply and to permit the release of the imprisoned air within the tool.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A valve of the character described including a stem having transverse passages extending entirely therethrough, and passages leading respectively from said first passages to the opposite ends of said stem, a casing surrounding said transverse passages and having oppositely disposed chambers, said casing being rotatable relatively to said stem to permit said chambers to jointly form ports between adjacent opposite ends of the transverse passages, substantially as described.

2. A valve of the character described including a stem being frusto-conical on its outer surface throughout a portion of its length and having two transverse passages extending entirely therethrough and positioned within the length of said frusto-conical portion, a casing rotatable on said frusto-conical portion, said stem having passages communicating respectively with said transverse passages and with opposite ends of the stem, a member detachably connected to said stem, and a spring interposed between said member and the casing to keep the latter in close fitting engagement with the stem, said casing having oppositely disposed chambers jointly movable into and out of registry with adjacent opposite ends of said transverse passages, substantially as described.

3. A valve of the character described including a stem being frusto-conical on its outer surface throughout a portion of its length and having two transverse passages extending entirely therethrough and positioned within the length of said frusto-conical portion, a casing rotatable on said frusto-conical portion, said stem having inlet and outlet passages communicating respectively with said transverse passages and with opposite ends of the stem, a member detachably connected to said stem, said casing having oppositely disposed chambers movable into and out of registry with adjacent opposite ends of said transverse passages, means for limiting the relative movement between the casing and stem, and vent holes formed respectively in the stem and casing, said vent holes being movable into registry when the chambers of the casing are moved out of registry with the transverse ports, the vent hole in said stem being in communication with the outlet passage of said stem, substantially as described.

4. A valve of the character described including a stem having transverse passages extending entirely therethrough, and inlet and outlet passages leading respectively from said first passages to the opposite ends of said stem, a casing surrounding said transverse passages and having oppositely disposed chambers, said casing being rotatable relatively to said stem to permit said chambers to form ports between adjacent opposite ends of the transverse passages, the opposite ends of said stem being screw-threaded, substantially as described.

In testimony whereof I have signed my name to this specification in the presence of two subscribing witnesses.

HARRY N. EVANS, Sr.

Witnesses:
MARY A. INGLAR,
CHAS. E. POTTS.